No. 644,212. Patented Feb. 27, 1900.
E. G. NICEWANER.
MOTOR SUSPENSION.
(Application filed Aug. 22, 1899.)

(No Model.)

WITNESSES:
Myrtle E. Sharpe.
A. M. Moses.

INVENTOR
E. G. Nicewaner
BY
Geo. H. Parmelee
his ATTORNEY.

UNITED STATES PATENT OFFICE.

EDWIN G. NICEWANER, OF JOHNSTOWN, PENNSYLVANIA, ASSIGNOR TO THE LORAIN STEEL COMPANY, OF PENNSYLVANIA.

MOTOR SUSPENSION.

SPECIFICATION forming part of Letters Patent No. 644,212, dated February 27, 1900.

Application filed August 22, 1899. Serial No. 728,069. (No model.)

*To all whom it may concern:*

Be it known that I, EDWIN G. NICEWANER, of Johnstown, in the county of Cambria and State of Pennsylvania, have invented a new and useful Improvement in Motor Suspensions, of which the following is a full, clear, and exact description, reference being had to the accompanying drawings, which form a part of this specification.

This invention has relation to a motor suspension for electrically-propelled vehicles and is designed to provide means whereby the two driving-motors usually employed may be elastically supported at their nose ends independently of the vehicle-body and also of the truck-frame; also, to provide a suspension of this character composed of but few parts so arranged as not to unduly complicate the truck and which provides an effective cushion for the motors against movements due to torque and to track conditions.

With these objects in view my invention consists in a motor suspension composed of levers arranged in one or more pairs, the levers being loosely connected to the motor-casings and intercrossed and loosely connected to each other intermediate the motors, with a cushion which opposes its elastic resistance to the movement of the levers under the weight and torque of the motors, the whole forming an equalizing elastic self-support for the motors.

The invention also consists in the novel construction and combination of parts, all as hereinafter described, and pointed out in the appended claims, reference being had to the accompanying drawings, in which—

Figure 1:
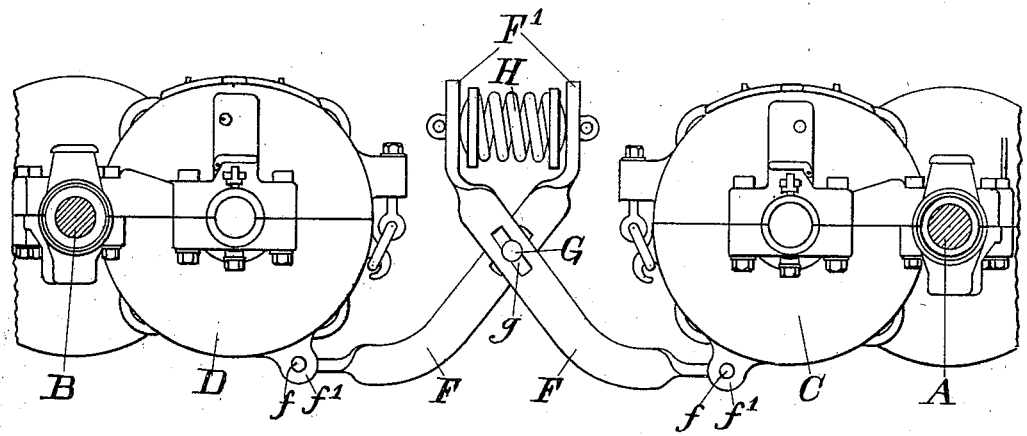
Figure 2:
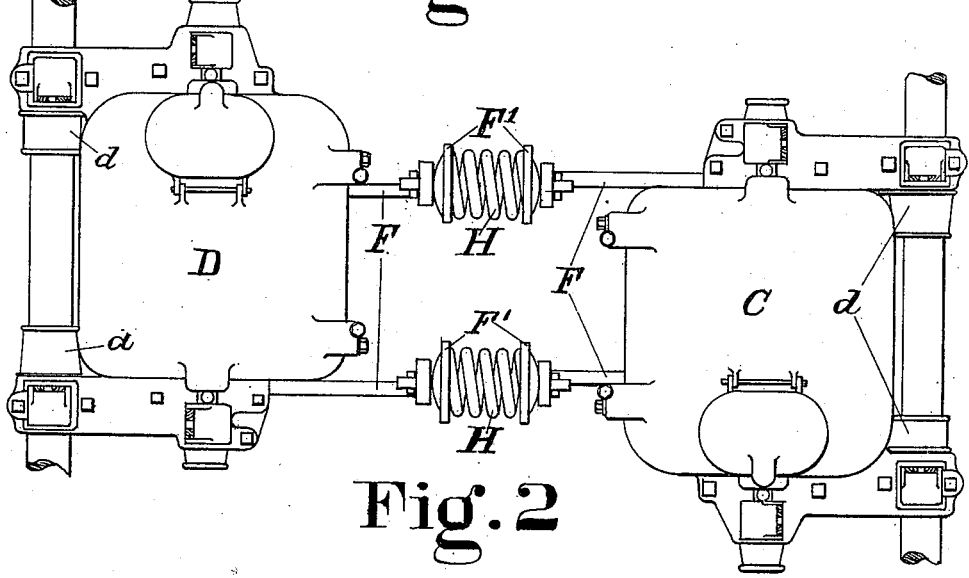

Figure 1 is a side elevation, partly broken away, illustrating the application of my invention; and Fig. 2 is a plan view of the same.

In the drawings, the letters A and B designate the two axles of the trucks, and C and D the two motors, which are loosely sleeved to said axles at *d* in the usual manner. The motors C and D have the usual sectional casings, as shown.

F F designate a pair of levers, each of which is pivotally connected at *f* to one of the motor-casings, at the lower side of the latter and forward of the armature-shaft, suitable lugs *f'* being provided on the casing to provide for the pivotal connections. Each lever a short distance from its pivot *f* is bent obliquely upward toward the opposite motor to a point above the center of the latter and is there bent into substantially vertical position to form the portion F', in which it terminates. The oblique portions of the two levers intercross and are loosely connected by a pin G, which passes through slots or apertures *g* of the levers.

H is a helical spring seated between the portions F' of the two levers and connected thereto by spring-caps and pins *f*.

Where heavy motors are used, I may employ two pairs of the levers F, each having a spring H, as shown in Fig. 3.

The levers arranged as described form a connection for the two motors capable of supporting them against undue vertical movement, while it permits readily sufficient movement to prevent undue strains and jars. It also forms through the spring an equalizer, whereby excessive vibration is prevented and an easy carriage of the motors is assured.

Having thus described my invention, what I claim, and desire to protect by Letters Patent, is—

1. The combination with two motors, each of which is sleeved to a vehicle-axle, of oblique interpivoted levers connecting the said motors, and a spring connecting arms of the said levers and acting in a direction to maintain their separation.

2. The combination with two motors, each of which is sleeved to a vehicle-axle, of intercrossed levers connected to the motors and to each other, and spring means for maintaining the separation of the arms of the said levers under the weight of the motors.

3. The combination with two motors, each of which is sleeved to a vehicle-axle, of levers pivoted to each motor, and intercrossing each other, a loose connection between said levers at their intercrossed portions, and a cushion-spring common to both levers.

4. The combination with two motors, each of which is sleeved to a vehicle-axle, of a pair of oblique intercrossed and interpivoted levers connecting the free ends of the motors, and a spring acting horizontally upon arms of said levers to maintain their separation under the weight of the motors.

5. The combination with a pair of sleeved motors, of levers pivoted to the motors at points on the opposite side of their centers from the sleeves and intercrossing each other intermediate the motors, a loose connection between the intercrossing portions of said motors, and a spring interposed between said levers above said connections.

6. The herein-described motor suspension comprising a pair of interpivoted levers each having one arm loosely connected to one of the motors, and a spring interposed between the opposite arms of said levers.

7. The herein-described motor suspension comprising in combination with a pair of sleeved motors, levers pivoted to the motors at one end portion and having upwardly-extending intercrossed portions formed with slots, a pin engaging the said slots, and a helical spring between said levers above the said pin.

In testimony whereof I have affixed my signature in presence of two witnesses.

E. G. NICEWANER.

Witnesses:
  B. M. SMITH,
  H. W. SMITH.